United States Patent Office 3,490,850
Patented Jan. 20, 1970

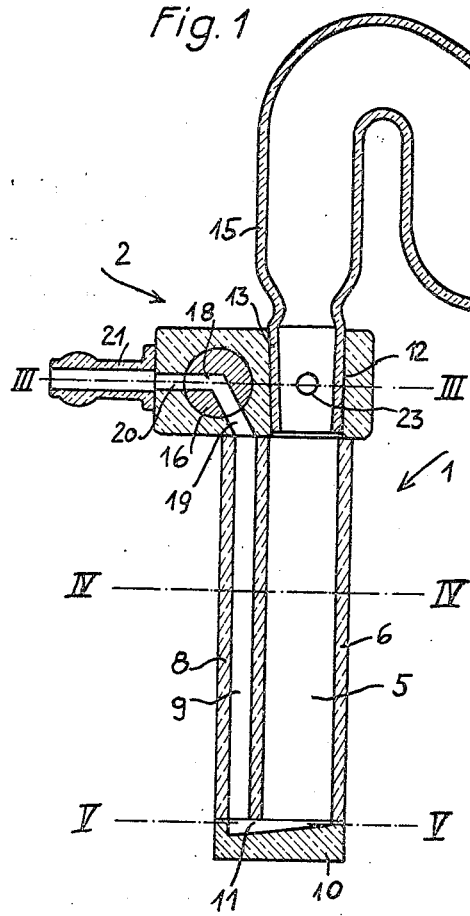
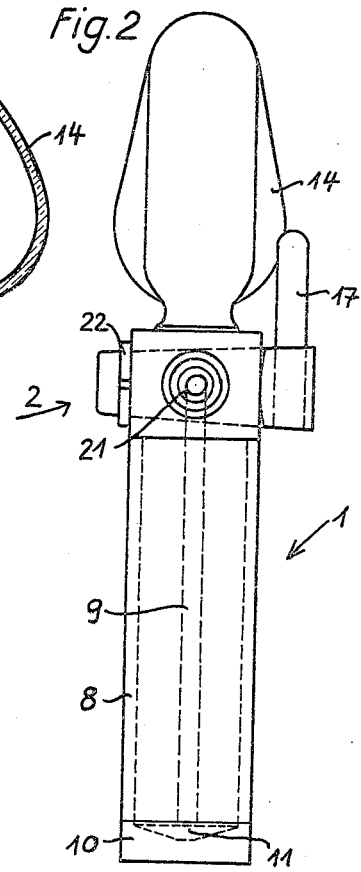
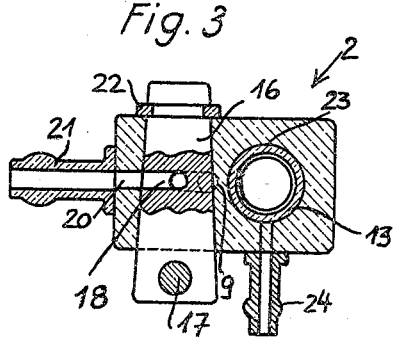
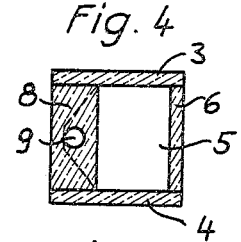
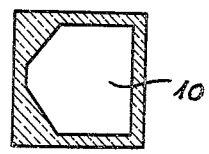
INVENTOR
Peter Mayer

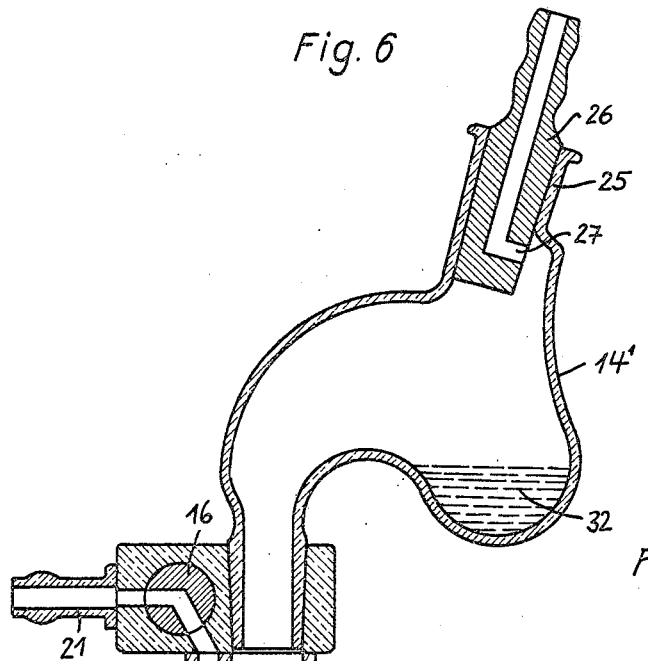
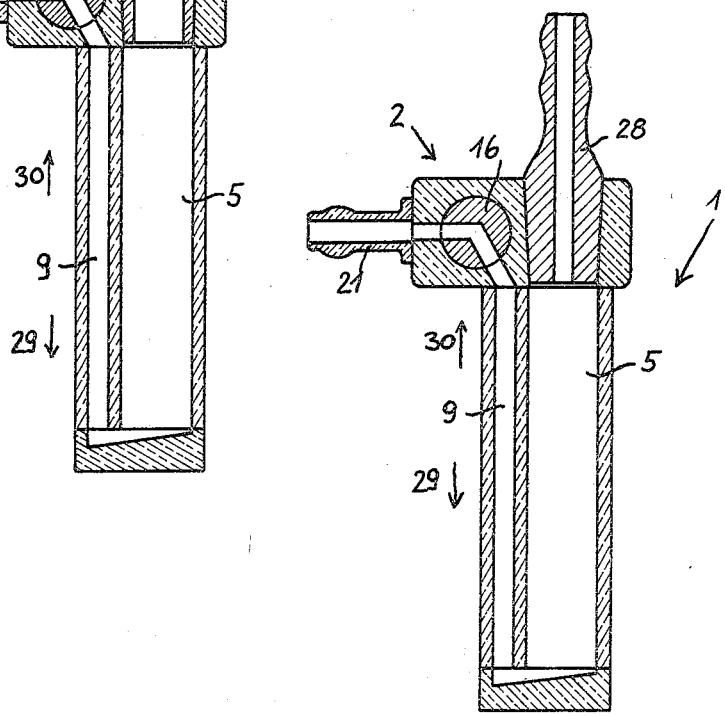

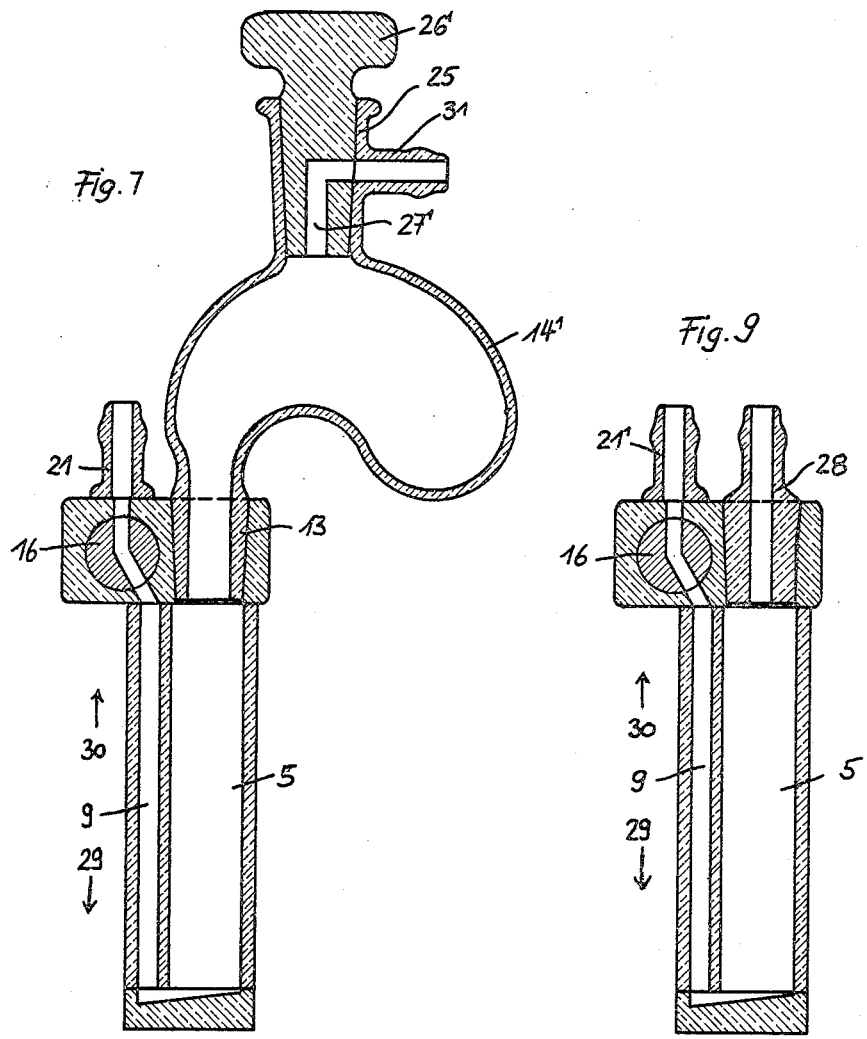

3,490,850
CELL FOR PHOTOMETRIC AND/OR SPECTROPHOTOMETRIC MEASUREMENTS
Peter Mayer, Mullheim, Baden, Germany, assignor to Hellma G.m.b.H. & Co., Mullheim, Baden, Germany, a firm
Filed Mar. 25, 1966, Ser. No. 537,435
Claims priority, application Germany, Mar. 30, 1965, H 55,638
Int. Cl. G01n 1/10
U.S. Cl. 356—246                         9 Claims

ABSTRACT OF THE DISCLOSURE

A multi-purpose cell device for photometric and spectrophotometric measurements comprising a structural housing part have a single common inlet/outlet orifice for fluid circulation; a vertically elongated two chamber device having a larger diameter measuring chamber and a smaller diameter charging/discharging passage; said chamber and said passage connected with each other at the bottom to provide a fluid conduit between them and mounted parallel to each other at their tops in said housing; said passage mounted in said housing connected for fluid flow with said common orifice.

FIELD OF ART

This invention relates to a cell for photometric and/or spectrophotometric measurements with a measuring chamber preferably having parallel inlet and outlet windows and with a charging or discharging passage provided additionally to the measuring chamber.

DESCRIPTION OF THE PRIOR ART

Measuring cells of the above-specified type are already known in themselves as so-called flow-through and suction cells.

SUMMARY OF THE INVENTION

The present invention has for its object to improve such a cell and to make it suitable also for other more or less differing purposes, namely by providing a reaction cell, that is to say, a cell for measuring fluids that have to be freed from oxygen, and such fluids the absorption of which has to be measured in the absence of air. The invention is thus concerned with a cell which permits anaerobic operations to be carried out in the easiest possible manner and under optimum conditions. What is essential is to be able to evacuate the cell or to have a gas containing no oxygen, e.g. nitrogen, argon or the like, percolate through the solution to be measured, in order to free the test fluid also from such oxygen that is dissolved in the test fluid.

To be able to meet the above-mentioned working conditions, the invention provides a cell for photometric and/or spectrophotometric measurements, which comprises a measuring chamber, a charging or discharge passage provided additionally to said measuring chamber, and a device provided for said additional passage for opening and closing one end thereof.

The device for opening and closing the end of the additional passage may be constructed in the form of a rotatable plug of a cock.

According to a further development of the invention, the measuring chamber of the cell may have an exchangeable reaction vessel associated therewith which may served, for example, for admixing a second solution to the test fluid and which, for closing an inlet, may be rotatable in a ground opening and additionally provided with its own closable opening.

Furthermore, with respect to the constructional design of the cell as proposed by the invention, particular advantages are obtained when the closing device for the additional channel of the cell and the insertable reaction vessell are seated in a common structural part which may be, for example, of block type form and closes the cell at the top end thereof.

Several embodiments of the invention will now be described by way of example and with reference to the accompanying drawings, in which:

BRIEF DESCRIPTION OF THE DRAWINGS

FIG. 1 is a central longitudinal section through a flow-through or suction cell according to the invention together with a reaction vessel provided with a ground mouthpiece;

FIG. 2 is a side elevational view of the cell of FIG. 1, showing that side of the cell which is provided with the connecting piece communicating with the additional passage of the cell;

FIG. 3 is a cross section through the cell taken on line III—III of FIG. 1;

FIG. 4 is a cross section through the cell taken on the line IV—IV of FIG. 1;

FIG. 5 is a cross section through the cell taken on the line V—V of FIG. 1;

FIG. 6 is a central longitudinal section through a further developed form of a multi-purpose cell;

FIG. 7 is a central longitudinal section through a further embodiment of the cell wherein the reaction vessel has a rotatable stopper in its opening and the connecting piece on the block type structural part extends vertically upwardly;

FIG. 8 is a central longitudinal section through a further embodiment of the cell, and FIG. 9 is a central longitudinal section through substantially the same embodiment wherein, however, the connecting piece communicating through the plug cock with the additional passage extends vertically upwardly.

DESCRIPTION OF THE PREFERRED EMBODIMENTS

With reference now to the drawings, reference numeral 1 designates generally a cell body. This body is closed at its top by a block type structural part designated generally by reference numeral 2. This structural part has been made separately and then attached on top of the cell body 1. The connection of the two mentioned parts which preferably consist of glass may be effected by melting them together or by a suitable adhesive or by such a putty that practically undetachably connects the faces engaging each other.

The cell body 1 is formed by two small highly transparent parallel plates 3 and 4 defining the width and the height of the cell body 1 to be produced. These spaced plates 3 and 4 form between them a measuring chamber 5 for the reception of a fluid to be tested or analyzed phontometrically or spectrophotometrically. This measuring chamber 5 is closed on one side by a small plate 6 expediently also of glass which is inserted between the plates 3 and 4. This plate 6 may be transparent, frosted or highly translucent according to the measuring purpose of the cell. Its surface is sufficiently wide and high to close this side of the cell body by a suitable connection at its longitudinal edges abutting against the plates 3 and 4. On the side of the measuring chamber 5 opposite the small plate 6 a further small closing plate 8 is provided in a similar manner. This plate 8, however, has a greater wall thickness and is provided over its entire length with a continuous bore 9 which serves as an additional passage opening into the measuring chamber 5. The cell body 1 is closed at its bottom by a bottom plate 10 the inner face of which is inclined downwardly toward the bore 9, thus providing a passage 11 leading to the bore 9. The botom plate 10 is connected to the lower ends of the walls of the cell body 1 by melting or by means of a putty or the like. This bottom plate 10 may be transparent according to the intended use of the cell.

As already mentioned, the above-described cell body 1 is closed at its top by the structural part 2. This structural part is constructed expediently in such a manner that it does not exceed the width of the cell body 1. The structural part 2 is provided centrally of the measuring chamber 5 with a ground bore 12 in which, according to the embodiment shown in FIGS. 1 to 5, a balloon type reaction vessel 14 equipped with a ground mouthpiece 13 is inserted. This vessel 14 together with a connecting neck 15 is made of glass.

The structural part 2 contains a rotatable plug 16 which can be turned externally by means of a control lever 17 and thus becomes a regulating cock which permits the bore 9 to be opened or hermetically closed as desired near the upper end therof. For this purpose the plug 16 has an angular bore 18 which in the position of the rotatable plug shown in FIG. 1 communicates, on the one hand, with a bore 19 in the structural part 2 and, on the other hand, with a bore 20 in the structural part. The bore 19 in turn communicates with the bore 9 in the plate 8 of the cell body 1 and the bore 20 communicates with a connecting piece 21 provided with an olive-shaped boss for retaining a flexible tube fitted on the connecting piece. By turning the plug 16 which is secured at its projecting end opposite the control lever 17 against axial shifting by a retainer ring 22, it is achieved that the plug 16 hermetically closes the passage from and to the bore 9. The ground mouthpiece 13 can be provided with a bore 23, shown in dash line in FIG. 1, which after appropriate turning of the reaction vessel 14 can be brought into register with a connecting piece 24 provided with an olive-shaped boss for retaining a flexible tube on the connecting piece.

FIG. 6 shows a balloon type reaction vessel $14^1$ having a slightly different configuration. This reaction vessel is equipped with a ground tube 25 permitting the insertion therein of a ground mouthpiece 26 on which a flexible tube can again be fitted. Turning the mouthpiece 26 about its longitudinal axis causes a bore 27 in the mouthpiece 26 communicating with the flexible tube to be opened or, with the mouthpiece 26 in a position turned through an angle of 180 degrees relative to the position of FIG. 6, to be hermetically closed by the wall of the ground tube 25. The form of the reaction vessel $14^1$ is slightly shallower than the form of the reaction vessel 14 shown in FIG. 1 and, therefore, is more favourable for pouring the fluid from the reaction vessel into the measuring chamber 5 or vice versa.

FIG. 7 shows an embodiment wherein instead of a ground mouthpiece a ground stopper $26^1$ is inserted in the opening of the reaction vessel $14^1$. This ground stopper is rotatable and has an angular bore $27^1$, so that it can likewise act as a cock. In the position of the stopper shown in FIG. 7 the bore $27^1$ communicates with an outwardly projecting connecting piece 31 fixed to the ground tube 25 of the reaction vessel and provided with an olive-shaped boss for retaining a flexible tube fitted on the connecting piece.

The purpose of the reaction vessel 14 or $14^1$ is to receive a suitable chemical substance 32 which can then be utilized e.g. for reaction purposes in that it is emptied into the measuring chamber in the course of measuring or prior thereto or at any other suitable moment or in that test fluid is brought to it from the measuring chamber. The withdrawal of gases which have formed or the admission of a test medium or an additional liquid substance influencing the test medium can be effected through the mouthpiece 26 or the stopper $26^1$ at any desired time. On the other hand, turning the mouthpiece or the stopper permits the measuring cell to be hermetically closed also in this place. In this arrangement the reaction vessel 14 or $14^1$ together with its ground mouthpiece 13 and the bore 23 formed transversely in the mouthpiece can be utilized at the same time as an openable stopcock.

FIG. 8 shows a flow-through cell having instead of a reaction vessel a ground mouthpiece 28 inserted therein on which a flexible tube can be fitted. In this arrangement a medium can be supplied under presure to the measuring chamber 5 from the connecting piece 21 through the bore 9 in the direction of arrow 29 or drawn off from the measuring chamber 5 through the bore 9 and the connecting piece 21 in the direction of arrow 30. Turning the plug 16 permits the passage to the bore 9 to be opened or closed as desired. Of course, the bore 9 permits to feed to the measuring chamber 5, apart from a liquid, also a gas for the treatment of the test fluid contained in the measuring chamber, which gas is intended to cause a certain reaction or to remove or absorb oxygen or another gas present in the cell. However, it is important for all cases and especially for anaerobic operations that the bore 9 can be hermetically closed by the rotatable plug 16.

As shown in FIG. 9, a connecting piece $21^1$ communicating through the rotatable plug 16 with the bore 9 extends verticaly upwardly, whereby more favorable structural conditions are obtained for certain cases.

I claim:

1. A multi-purpose cell device for photometric and spectrophotometric measurements comprising: a structural housing part having a single common inlet/outlet orifice for fluid circulation; a vertically elongated two chamber device comprising a reaction chamber, a measuring chamber having a large diameter and a small diameter charging/discharging passage; said measuring chamber and said passage connected with each other at the bottom to provide a fluid conduit between them and mounted parallel to each other at their tops in said housing; said passage mounted in said housing connected for fluid flow with said common orifice, said measuring chamber having parallel inlet and outlet windows; said reaction chamber having an inverted U shape with one leg thereof associated with said measuring chamber; and a structurel part closing the top of said measuring chamber and forming a seat for said inlet/outlet orifice, and for said reaction chamber; and valve means to open and close said passage.

2. A cell device as claimed in claim 1, further comprising upper outlet means, said measuring device and housing and a reaction chamber mounted with an orifice removably in said housing above said measuring chamber aligned for fluid flow with said measuring chamber through said outlet means.

3. A cell device as claimed in claim 2 and means to close said upper outlet means.

4. A cell device as claimed in claim 2, said reaction chamber provided with an upper orifice with connecting means and means to close it.

5. A cell device as claimed in claim 2, said reaction chamber comprising an inverted fluid gravitational tuberous downward vertical protrusion for a temporary storage of a fluid separably from that of said measuring device.

6. A cell device as claimed in claim 4, said common inlet/outlet orifice and said upper orifice of said measuring chamber being directed upwards through said housing.

7. A cell as claimed in claim 1, wherein the valve means to open and close said passage is constructed in the form of a rotatable plug of a cock.

8. A cell as claimed in claim 1, wherein the reaction chamber is exchangeable.

9. A cell as claimed in claim 8, wherein a ground opening is provided at the upper end of the measuring chamber for the insertion of the reaction chamber therein, and wherein a ground mouthpiece is associated with the reaction chamber and the reaction chamber has a ground opening for the reception of the ground mouthpiece which can act as a stopcock when turned about its longitudinal axis.

(References on following page)

References Cited

UNITED STATES PATENTS

| | | |
|---|---|---|
| 3,053,138 | 9/1962 | Sanz. |
| 3,280,857 | 10/1966 | DeGrave, et al. |
| 3,345,910 | 10/1967 | Rosin et al. |

FOREIGN PATENTS

| | | |
|---|---|---|
| 643,850 | 6/1962 | Canada. |
| 1,355,402 | 2/1964 | France. |

OTHER REFERENCES

"Optical Absorption Cells," Bulletin No. 65 of the Optical Cell Co., Inc., Brentwood, Md., December 1964, 2 pp. (page 7 and price sheet).

"Modern Laboratory Appliances," Fisher Scientific Co., et al. (1942) p. 274, see esp. 6–477, Oxidation Tube, Thunberg.

RONALD L. WIBERT, Primary Examiner

R. J. WEBSTER, Assistant Examiner